(12) United States Patent
Thompson et al.

(10) Patent No.: US 7,766,109 B2
(45) Date of Patent: Aug. 3, 2010

(54) HYBRID POWERTRAINS AND METHODS OF OPERATING

(75) Inventors: Scott Thompson, Waterford, MI (US); James Sydenstricker, Linden, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 346 days.

(21) Appl. No.: 11/864,223

(22) Filed: Sep. 28, 2007

(65) Prior Publication Data

US 2009/0084618 A1   Apr. 2, 2009

(51) Int. Cl.
 *B60W 10/18* (2006.01)
(52) U.S. Cl. .............................. 180/65.265; 180/65.27; 180/65.275; 180/65.28
(58) Field of Classification Search ............ 180/65.225, 180/65.23, 65.235, 65.265, 65.27, 65.275; 903/930, 945, 946; 701/22
 See application file for complete search history.

(56) References Cited

U.S. PATENT DOCUMENTS

| | | | |
|---|---|---|---|
| 5,806,617 A * | 9/1998 | Yamaguchi ............ 180/65.235 |
| 6,428,444 B1 * | 8/2002 | Tabata ............................ 477/3 |
| 6,480,767 B2 * | 11/2002 | Yamaguchi et al. ........... 701/22 |
| 6,621,244 B1 * | 9/2003 | Kiyomiya et al. ............ 318/611 |
| 6,870,336 B2 * | 3/2005 | Murakami et al. ........... 318/432 |
| 7,074,157 B2 * | 7/2006 | Wakashiro et al. ............. 477/7 |
| 7,090,612 B2 * | 8/2006 | Ozeki et al. ..................... 477/3 |
| 7,223,202 B2 * | 5/2007 | Tryon et al. ..................... 477/5 |
| 2005/0139400 A1 * | 6/2005 | Gee .......................... 180/65.2 |

* cited by examiner

*Primary Examiner*—Paul N Dickson
*Assistant Examiner*—Erez Gurari
(74) *Attorney, Agent, or Firm*—Ingrassia Fisher & Lorenz, P.C.

(57) ABSTRACT

Hybrid powertrains and methods of operating the hybrid powertrains are provided. In an embodiment, the method includes determining whether a temperature of a battery pack in a battery pack module is above or below a first threshold, and providing a command to an electrically variable transmission module to select either a first mode or a second mode in which to operate, when the determination is made that the temperature of the battery pack is below the first threshold.

16 Claims, 2 Drawing Sheets

HYBRID POWERTRAINS AND METHODS OF OPERATING

TECHNICAL FIELD

The inventive subject matter generally relates to hybrid powertrains, and more particularly relates to methods of operating hybrid powertrains.

BACKGROUND

Hybrid powertrain systems are configured to manage input and output torques of various prime-movers in hybrid vehicles, such as internal combustion engines and electric machines. In some hybrid powertrain architectures, the internal combustion engine drives an electric generator, which in turn provides electrical power to an electric drivetrain and to a battery pack. The electric generator may also provide a starting function to the internal combustion engine, and the electric drivetrain may recapture vehicle braking energy to recharge the battery pack. In other configurations, the internal combustion engine and an electric motor are directly mechanically coupled to the drivetrain, which includes a shifting transmission to provide suitable gear ratios, such as variable speed ratios, for a wide range of operations.

To provide continuously variable speed ratios, the powertrain may include an electrically variable transmission (EVT). Generally, an EVT is operable with a direct mechanical path between an internal combustion engine and a final drive unit to thereby enable high transmission efficiency. EVTs can also operate mechanically independently from the final drive unit and may be able to operate in various mechanical/electrical split contributions to enable high-torque continuously variable speed ratios, electrically dominated launches, regenerative braking, engine off idling, and multi-mode operation.

An amount of power to drive the internal combustion engine may be selected based on a road-load demand and on a state-of-charge of the battery pack. Following selection of the engine power amount, the engine's optimal fuel economy or optimal emissions map or a combination thereof may be used to select a torque/speed operating point for the engine. The battery pack may output additional power, in combination with the engine power, to meet the road-load power demands and to compensate for power losses within the hybrid powertrain system.

Although the aforementioned hybrid powertrain architectures generally operate suitably in most circumstances, they may be improved. For example, power output by the battery pack may not operate as intended when exposed to extremely cold temperatures (e.g., below about 0° C.). In particular, the state-of-charge of the battery pack may be affected by such temperatures, and the battery pack may not be capable of meeting the power demands of the powertrain and/or the EVT under such conditions.

Accordingly, it is desirable to have an improved hybrid powertrain architecture that is capable of operating in temperatures of at least 0° C. or below. Furthermore, other desirable features and characteristics of the inventive subject matter will become apparent from the subsequent detailed description and the appended claims, taken in conjunction with the accompanying drawings and the foregoing technical field and background.

SUMMARY OF THE INVENTIVE SUBJECT MATTER

A hybrid powertrain is provided for use in a vehicle including an engine coupled to a motor, wherein the motor includes a plurality of gears, and the engine includes a plurality of cylinders. The hybrid powertrain includes a battery pack, a temperature sensor, an electrically variable transmission, and a hybrid control module. The battery pack is configured to supply power to the motor. The temperature sensor is in communication with the battery pack and is configured to sense a temperature of the battery pack. The electrically variable transmission is configured to provide commands to damp vibrations from the engine. The hybrid control module is configured to communicate with the temperature sensor to determine whether the sensed temperature of the backpack is above or below a first threshold and to communicate with the electrically variable transmission such that when the determination is made that the temperature of the battery pack is below the first threshold, the hybrid control module provides commands to the electrically variable transmission to limit a gear shift command to a first mode and a second mode.

A method is provided for operating a hybrid powertrain including a hybrid control module configured to supply commands to an electrically variable transmission, wherein the electrically variable transmission is configured to supply gear shift commands to a plurality of gears of a vehicle and to receive power from a battery pack module. The method includes determining whether a temperature of a battery pack in the battery pack module is above or below a first threshold, and providing a command to the electrically variable transmission to limit a gear shift command to either a first mode or a second mode in which to operate, when the determination is made that the temperature of the battery pack is below the first threshold.

DESCRIPTION OF THE DRAWINGS

The inventive subject matter will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
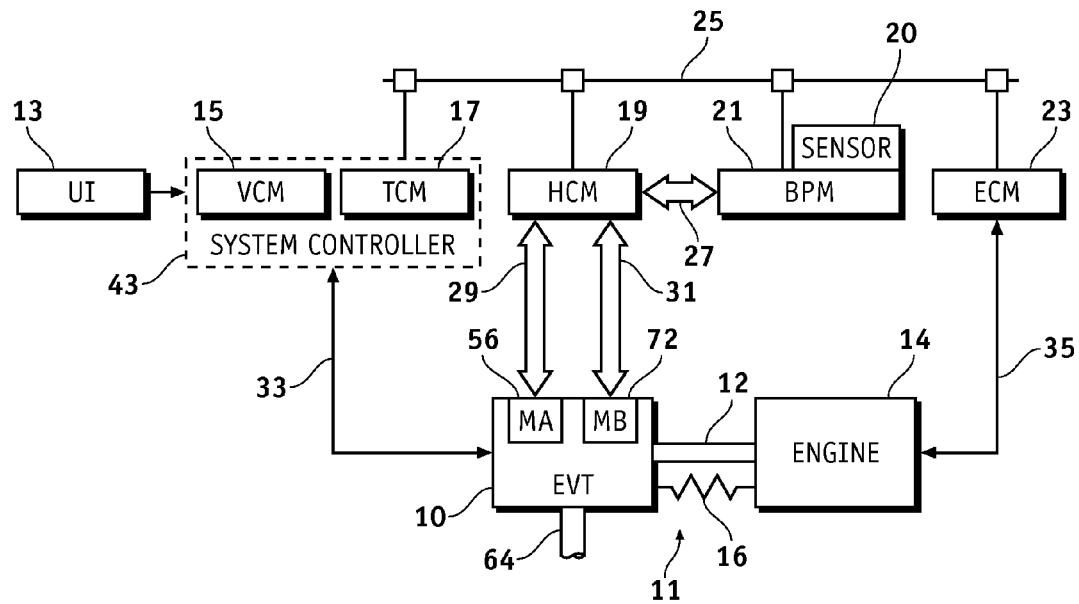
FIG. 1 is an electrical and mechanical schematic of a system architecture for a hybrid powertrain, according to an embodiment.

FIG. 1 is a schematic of a system architecture for a hybrid powertrain 11, according to an embodiment. The powertrain 11 may include a hybrid control module (HCM) 19 that communicates with and provides commands to an electrically variable transmission (EVT) 10, a battery pack module (BPM) 21, an engine control module (ECM) 23, and a system controller 43. In an embodiment, the HCM 19 includes a pair of power inverters (not shown) and respective motor controllers (not shown) capable of receiving motor control commands and of controlling inverter states to provide motor drive or regeneration functionality. In the motor drive function, the inverters receive current from DC lines and provide AC current to the respective motors of the EVT 10 over high voltage phase lines 29 and 31. In the regeneration function, the inverters receive AC current from corresponding motors over high voltage phase lines 29 and 31 and provide current to DC lines 27. The net DC current provided to or from the inverters determines the charge or discharge operating mode of the BPM 21. As mentioned above, the motor controllers control the inverters, and in this regard, may be microprocessor-based controllers comprising conventional elements, such as a microprocessor, read only memory (ROM), random access memory (RAM), electrically programmable read only memory (EPROM), high speed clock, analog to digital (A/D) and digital to analog (D/A) circuitry, input/output (I/O) circuitry, and devices and appropriate signal conditioning and buffer circuitry.

The EVT 10 communicates with the HCM 19 to receive commands therefrom to thereby provide a plurality of modes of operation to the hybrid powertrain 11. In an embodiment, the EVT 10 has an input member 12 that may be a shaft, which may be directly driven by an engine 14. In the embodiment shown in FIG. 1, a torque damper 16 may be incorporated between an output member of the engine 14 and the input member 12 of the EVT 10. The torque damper 16 may receive commands from the EVT 10 to damp vibrations from the engine 14. In still another embodiment, the torque damper 16 may incorporate, or be employed in conjunction with, a torque transfer device (not shown) to permit selective engagement of the engine 14 with the EVT 10.

Figure 2:
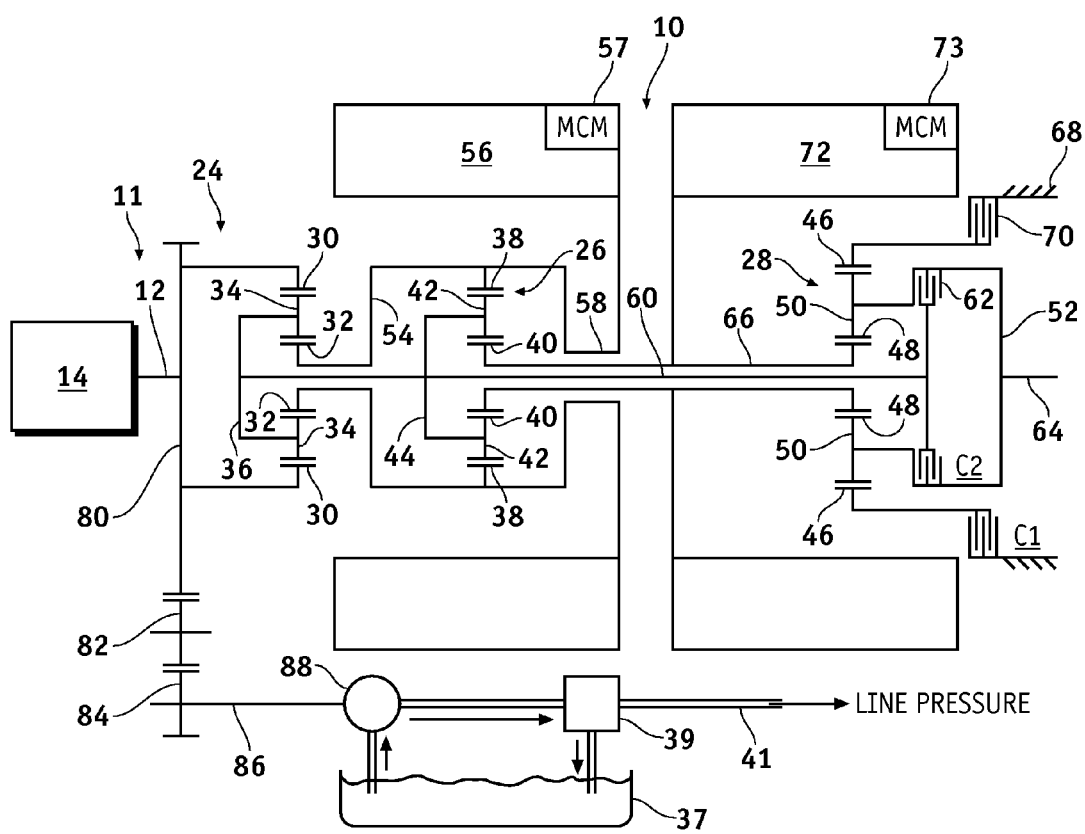
FIG. 2 is an electrical and mechanical schematic of an electrically variable transmission that may be implemented into the hybrid powertrain shown in FIG. 1, according to an embodiment.

An embodiment of a schematic of the EVT 10 is shown in FIG. 2. Here, the EVT 10 is illustrated as being capable of providing a plurality of modes of operation to the hybrid powertrain 11 via appropriate gearing combinations of one or more planetary gear subsets 24, 26, 28. In an embodiment, three gear subsets 24, 26, 28 are included, and each is made up of a plurality of gears. For example, the first planetary gear subset 24 has an outer gear member 30, which circumscribes an inner gear member 32. A plurality of planetary gear members 34 are rotatably mounted on a carrier 36 such that each planetary gear member 34 meshingly engages both the outer gear member 30 and the inner gear member 32. The second planetary gear subset 26 also has an outer gear member 38, which circumscribes an inner gear member 40. A plurality of planetary gear members 42 are rotatably mounted on a carrier 44 such that each planetary gear 42 meshingly engages both the outer gear member 38 and the inner gear member 40. The third planetary gear subset 28 also has an outer gear member 46, which circumscribes an inner gear member 48. A plurality of planetary gear members 50 are rotatably mounted on a carrier 52 such that each planetary gear 50 meshingly engages both the outer gear member 46 and the inner gear member 48.

The inner gear member 32 of the first planetary gear subset 24 may be conjoined, via a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56 via a sleeve shaft 58. The first motor/generator 56 may also be referred to herein variously as motor A or MA and may be controlled by a motor control module (MCM) 57. MCM 57 may communicate with the HCM 19 and may receive commands therefrom.

The carrier 36 of the first planetary gear subset 24 may be conjoined via a shaft 60, to the carrier 44 of the second planetary gear subset 26. As such, the carriers 36 and 44 of the first and second planetary gear subsets 24 and 26, respectively, are conjoined. The shaft 60 is also selectively connected to the carrier 52 of the third planetary gear subset 28 via a torque transfer device 62. The torque transfer device 62 or "second clutch C2" may be employed to assist in the selection of the operational modes of the EVT 10.

The carrier 52 of the third planetary gear subset 28 is connected directly to the transmission output member 64. In an embodiment in which the EVT 10 is used in a land vehicle, the output member 64 may be connected to vehicular axles (not shown) that may, in turn, terminate in drive members (not shown). The drive members may be either front or rear wheels of a vehicle on which they are employed, or a drive gear of a track vehicle.

The inner gear member 40 of the second planetary gear subset 26 is connected to the inner gear member 48 of the third planetary gear subset 28 via a sleeve shaft 66 that circumscribes shaft 60. The outer gear member 46 of the third planetary gear subset 28 is selectively connected to ground, which may be a transmission housing 68, through a torque transfer device 70. The torque transfer device 70 or "first clutch C1" may also be employed to assist in the selection of the operational modes of the EVT 10.

The sleeve shaft 66 is also continuously connected to a second motor/generator 72. The second motor/generator 72 may also be referred to herein as motor B or MB. Motor B may be controlled by a motor control module (MCM) 73. The MCM 73 may communicate with the HCM 19 (FIG. 1) and may receive commands therefrom. All the planetary gear subsets 24, 26, and 28 as well as motor A 56 and motor B 72 are coaxially oriented, as about the axially disposed shaft 60. Both motors A and B 56, 72 may have an annular configuration and may circumscribe the three planetary gear subsets 24, 26, and 28 such that the planetary gear subsets 24, 26, and 28 are disposed radially inwardly of the motors A and B.

A drive gear 80 may be presented from the input member 12 to the outer gear member 30 of the first planetary gear subset 24, and may, therefore, receive power from the engine 14 and/or motor A 56 or motor B 72. The drive gear 80 meshingly engages an idler gear 82 which, in turn, meshingly engages a transfer gear 84 that is secured to one end of a shaft 86. The other end of the shaft 86 may be secured to a transmission fluid pump 88 which is supplied transmission fluid from sump 37, delivering high pressure fluid to regulator 39 which returns a portion of the fluid to sump 37 and provides regulated line pressure in line 41.

The output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced, an upper case designation MODE 1 or MODE 2, or M1 or M2, will generally be used.

The EVT 10 is further configured to provide a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable of providing synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Returning to FIG. 1, in addition to selectively receiving power from the engine 14, the EVT 10 also receives power from an electric storage device such as one or more batteries in the BPM 21. Although described as a battery, other electric storage devices that have the ability to store electric power and dispense electric power may be used in place of the batteries. The BPM 21 may be a high voltage DC device that may be coupled to the HCM 19 via DC lines 27. Current may be transferable to or from the BPM 21 in accordance with whether the BPM 21 is being charged or discharged, as described above. In an embodiment, a temperature sensor 20 may be disposed on or proximate the BPM 21. The temperature sensor 20 may sense temperature data relating to the BPM 21 and may communicate the data to the HCM 19. The temperature data may be used by the HCM 19 to provide commands to limit power output from the batteries of the BPM 21.

The engine 14 may be electronically controlled by the ECM 23, which may in turn, receive commands from the HCM 19, as illustrated in FIG. 1. The ECM 23 may comprise a microprocessor, ROM, RAM, EPROM, high speed clock, analog to digital (A/D) and digital to analog (D/A) circuitry, input/output circuitry and devices (I/O), and appropriate signal conditioning and buffer circuitry. The ECM 23 may acquire data from a variety of sensors and may control a variety of actuators of the engine 14 over a plurality of discrete lines. The ECM 23 may be in bi-directional interface with the engine 14 via an aggregate line 35. Among the various data that may be sensed by the ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. For example, the ECM 23 may receive commands from the HCM 19 to supply fuel to a plurality of cylinders. Thus, the ECM 23 may provide commands to appropriate actuators to supply fuel to (i) all of the cylinders, (ii) a portion of the cylinders (e.g., half), or (iii) none of the cylinders. Additionally, the ECM 23 may provide for well-known torque based controls for the engine 14 in response to a torque command (Te_cmd) provided by the EVT control system.

The system controller 43 may be configured to receive commands from the HCM 19 and to provide commands related to a variety of control and diagnostic functions for the EVT 10 and vehicle chassis. In this regard, the system controller 43 may be made up of a pair of microprocessor-based controllers, which may be referred to as a vehicle control module (VCM) 15 and a transmission control module (TCM) 17. The controllers may comprise microprocessors, ROM, RAM, EPROM, high speed clock, analog to digital (A/D) and digital to analog (D/A) circuitry, digital signal processor (DSP), and input/output circuitry and devices (I/O), and appropriate signal conditioning and buffer circuitry. The VCM 15 and TCM 17 may provide, for example, engine torque commands, input speed control, and output torque control in coordination with regenerative braking, anti-lock braking and traction control. Particularly with respect to EVT functionality, the system controller 43 functions to directly acquire data from a variety of sensors and directly control a variety of actuators, respectively, of the EVT 10 over a plurality of discrete lines. In an embodiment, the system controller 43 may be in bi-directional interface with the EVT 10 via an aggregate line 33 and may receive frequency signals from rotation sensors for processing a speed into input member (Ni) and a speed into output member 64 (No) for use in the control of the EVT 10.

The system controller 43 may also determine a torque command (Te_cmd) and provides the command to the ECM 23. The torque command (Te_cmd) is representative of the EVT torque contribution desired from the engine as determined by the system controller 43. The system controller 43 may also determine a speed command (Ne_des) representative of the EVT input speed desired, which may also be a desired engine speed operating point.

The various modules described (i.e. HCM 19, BPM 21, ECM 23, and system controller 43) communicate via a controller area network (CAN) bus 25. The CAN bus 25 allows for communication of control parameters and commands between the various modules. The specific communication protocol utilized will be application specific.

As mentioned briefly above, the HCM 19 may receive data related to a temperature sensed from a battery pack of the BPM 21. In an event in which the sensed temperature is to be below a first threshold, such as below a temperature at which the powertrain 11 may function without incurring damage to its components (e.g. below about 0° C.), the HCM 19 may provide commands to other modules of the hybrid powertrain 11 that may override existing commands in order to limit power usage of those modules to thereby reduce power output from the batteries of the BPM 21. Limiting the power usage of the modules in this way allows the hybrid powertrain 11 to continue operation under extremely cold conditions, such as in temperatures below about 0° C., without damaging the batteries, other components of the BPM 21, or other components of the hybrid powertrain 11.

Figure 3:
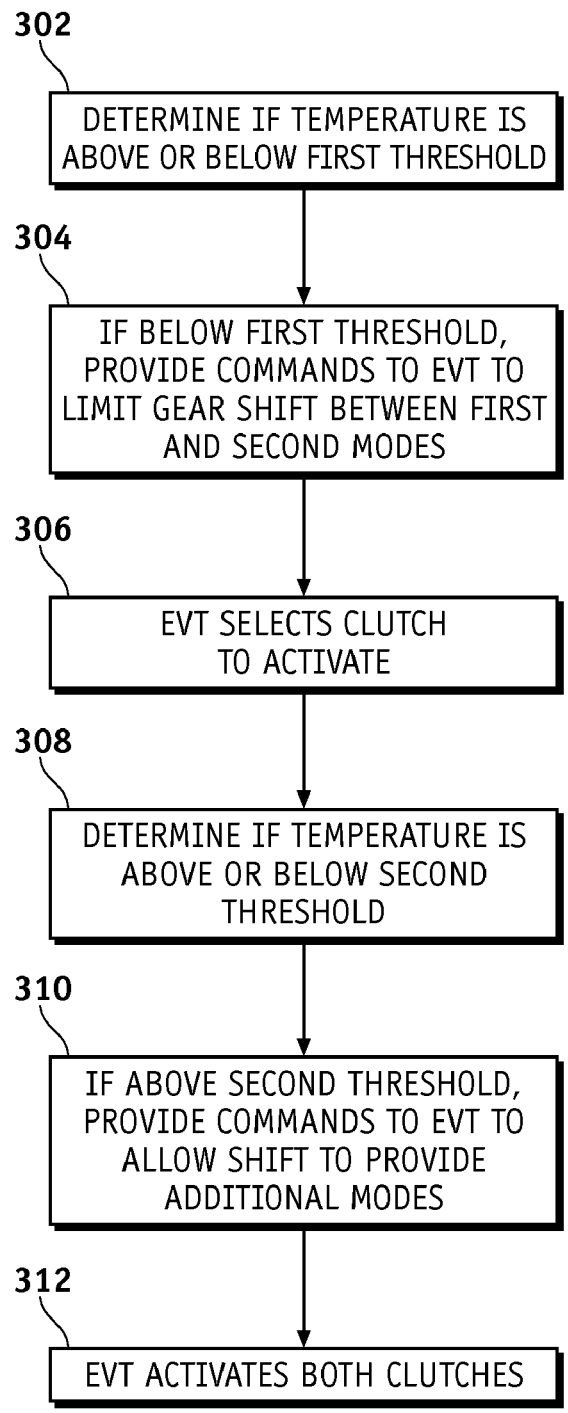
FIG. 3 is a flow diagram of a method of operating the hybrid powertrain, according to an embodiment.

In an embodiment, the HCM 19 limits the EVT 10 to operation between two modes. FIG. 3 is a flow diagram of a method 300 of operating the HCT 19, according to an embodiment. First, a determination is made as to whether a temperature of the battery pack of the BPM 21 is below a first threshold, step 302. The first threshold may be a temperature at which the powertrain 11 may operate that may cause damage to the batteries and other powertrain 11 components. For example, the first threshold may be about 0° C.±3° C. If the temperature is below the first threshold, the HCM 19 provides commands to the EVT 10 to limit its gear shifting commands between the first mode and the second mode (or MODE 1 and MODE 2), step 304. The EVT 10 then selects which clutch to activate, step 306. For example, the EVT 10 may select a first gear train in which the first clutch C1 is actuated in order to "ground" the outer gear member 46 of the third planetary gear subset 28, or the EVT 10 may select a second gear train in which the first clutch C1 is released and the second clutch C2 is simultaneously actuated to connect the shaft 60 to the carrier 52 of the third planetary gear subset 28.

A determination is then made as to whether a temperature of the battery pack of the BPM 21 is above a second threshold, step 308. In an embodiment, second threshold may be a temperature that is about 0° C.±3° C. In another embodiment, the second threshold may be about −17° C.±3° C. In still another embodiment, the second threshold may be equal to the first threshold. In still yet another embodiment, the second threshold may be a temperature that is above the first threshold. In still yet another embodiment, the second threshold may be a temperature that is less than the first threshold. In any case, if the determination is made that the temperature of the battery pack is above the second threshold, commands may be provided by the HCM 19 to the EVT 10 to allow additional gear shifts to occur to thereby provide additional modes, step 310. The EVT 10 then causes both clutches to be activated, step 312. In an embodiment, the EVT 10 may be instructed to provide commands to combine the first and the second modes with a slow to fast output speed range. The EVT 10 may resume providing commands for a fixed-ratio gearing state wherein both clutches C1 and C2 are simultaneously applied, a neutral gearing state wherein both clutches C1 and C2 are simultaneously released is available for mechanically decoupling the output member from the transmission, and/or synchronized shifting between the modes wherein slip speed across both clutches C1 and C2 is substantially zero.

In another embodiment, the HCM 19 may be configured to limit an amount of damping that may be provided by the torque damper 16 to the engine 14. For example, the HCM 19 may provide a command to the EVT 10 to decrease an amount of damping supplied to the engine 14 by the torque damper 16, when a determination is made that the temperature of the battery pack is below the first threshold. In an embodiment, the HCM 19 may instruct the EVT 10 not to supply power to the torque damper 16. When a determination is made that the temperature of the battery pack is above the second threshold, the HCM 19 may be configured to gradually increase power to the torque damper 16 so that at least a portion of the vibration from the engine 14 may be damped. The gradual increase in power may be directly related to the increase in temperature, and in an embodiment, may follow a linear function.

In still another embodiment, the HCM 19 may be configured to supply a command to the ECM 23 to command a plurality of fuel injectors to inject fuel into all of the cylinders, when a determination is made that the temperature of the battery pack module is below the first threshold. Thus, even if the system controller 43 provides a braking command to brake pads to slow the vehicle, the ECM 23 may continue to provide commands to the fuel injectors to continue to inject fuel into all of the cylinders, if a determination is made that the temperature of the battery pack remains below the first threshold. When the temperature is determined to be above the second threshold, the HCM 19 may be configured to supply a command to the ECM 23 to allow the plurality of fuel injectors to inject fuel into at least a portion (e.g., half) of the cylinders or none of the cylinders, instead of all of the cylinders.

An improved hybrid powertrain architecture has now been provided. The hybrid powertrain may be adapted to operate efficiently in extremely low temperatures (e.g., temperatures below 0° C.±3° C.) and may be used to prevent damage to battery packs that may be employed in conjunction with the powertrain when subjected to such temperatures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A hybrid powertrain for use in a vehicle including an engine coupled to a motor, wherein the motor includes a plurality of gears, and the engine includes a plurality of cylinders, the hybrid powertrain comprising:
   a battery pack configured to supply power to the motor;
   a temperature sensor in communication with the battery pack and configured to sense a temperature of the battery pack;
   an electrically variable transmission configured to damp vibrations from the engine;
   an engine control module configured to provide commands for supplying fuel to (i) all of the plurality of cylinders, (ii) a portion of the plurality of cylinders, or (iii) none of the plurality of cylinders;
   a system controller configured to provide a braking command to a brake pad; and
   a hybrid control module configured to communicate with the temperature sensor to determine whether the sensed temperature of the battery pack is above or below a first threshold and to communicate with the electrically variable transmission such that when the determination is made that the temperature of the battery pack is below the first threshold, the hybrid control module provides commands to the electrically variable transmission to limit a gear shift command between a first mode or a second mode, supplies a command to the engine control module to command the plurality of fuel injectors to inject fuel into all of the cylinders of the plurality of cylinders, and supplies commands to the system controller to provide a braking command to the brake pad when the engine control module is supplying a command to the fuel injectors to inject fuel into all of the cylinders of the plurality of cylinders.

2. The hybrid powertrain of claim 1, wherein the hybrid control module is further configured to provide a gear shift command to shift at least one gear of the plurality of gear sets to a third mode, after the determination is made that the temperature of the battery pack is above a second threshold.

3. The hybrid powertrain of claim 1, wherein:
   the electrically variable transmission includes a torque damper configured to damp vibrations of the engine; and
   the hybrid control module is further configured to provide a command to the electrically variable transmission to cause the torque damper to decrease an amount of damping supplied to the engine, when the determination is made that the temperature of the battery pack is below the first threshold.

4. The hybrid powertrain of claim 1, wherein the hybrid control module is configured to provide a command to the engine control module to command the plurality of fuel injectors to inject fuel into a portion of the cylinders of the plurality of cylinders, when the determination is made that the temperature of the battery pack is above a second threshold.

5. The hybrid powertrain of claim 1, wherein the first threshold is a temperature that is about 0° C.±3° C.

6. A method for operating a hybrid powertrain including a hybrid control module, an electrically variable transmission, an engine control module, and a system controller, the hybrid control module configured to supply commands to the electrically variable transmission, the electrically variable transmission operatively coupled to a plurality of gears of a vehicle and configured to receive power from a battery pack module, the engine control module configured to provide commands to an actuator to supply fuel to a plurality of cylinders, the actuator configured to selectively supply fuel to (i) all of the cylinders of the plurality of cylinders, (ii) a portion of the cylinders of the plurality of cylinders, or (iii) none of the cylinders of the plurality of cylinders, and the system controller configured to provide a braking command to one or more brake pads, the method comprising the steps of:

determining whether a temperature of a battery pack in the battery pack module is above or below a first threshold;

providing a command to the electrically variable transmission to limit a gear shift command to a first mode and a second mode in which to operate, when the determination is made that the temperature of the battery pack is below the first threshold;

supplying a command to the engine control module to command the plurality of fuel injectors to inject fuel into all of the cylinders, when the determination is made that the temperature of the battery pack is below the first threshold; and providing a braking command from the system controller to the one or more brake pads, when the engine control module is supplying the command to the fuel injectors to inject fuel into all of the cylinders of the plurality of cylinders.

7. The method of claim 6, wherein the step of providing a command to the electrically variable transmission further comprises providing a gear shift command to shift at least one gear of the plurality of gears to a third mode, after the determination is made that the temperature of the battery pack is above a second threshold.

8. The method of claim 6, wherein the vehicle further includes an engine configured to supply power to the electrically variable transmission, the electrically variable transmission comprises a torque damper configured to receive commands to damp vibrations from the engine, and the method further comprises:

providing a command to the torque damper to decrease an amount of damping supplied to the engine, when the determination is made that the temperature of the battery pack is below the first threshold.

9. The method of claim 8, further comprising the step of:

increasing an amount of damping supplied to the engine, when the determination is made that the temperature of the battery pack is above a second threshold.

10. The method of claim 9, wherein the step of increasing comprises increasing the amount of damping supplied to the engine based upon a linear function where an amount of power supplied to the torque damper is directly related to a selected sensed temperature of the battery pack.

11. The method of claim 6, further comprising providing a command to the engine control module to command the plurality of fuel injectors to inject fuel into a portion of the cylinders of the plurality of cylinders, when the determination is made that the temperature of the battery pack is above a second threshold.

12. The method of claim 6, wherein the first threshold is a temperature that is about $0° C. \pm 3° C$.

13. A method for operating a hybrid powertrain including a hybrid control module, an electrically variable transmission, an engine control module, and a system controller, the hybrid control module configured to supply commands to the electrically variable transmission and the engine control module, the electrically variable transmission configured to supply gear shift commands to a plurality of gears of a vehicle and to receive power from a battery pack module and an engine and comprises a torque damper configured to receive commands to damp vibrations from the engine, the engine control module configured to provide commands to an actuator to supply fuel to a plurality of cylinders, the actuator configured to selectively supply fuel to (i) all of the cylinders of the plurality of cylinders, (ii) a portion of the cylinders of the plurality of cylinders, or (iii) none of the cylinders of the plurality of cylinders, and the system controller configured to provide a braking command to one or more brake pads, the method comprising the steps of:

determining whether a temperature of the battery pack of the battery pack module is above or below a first threshold;

limiting the gear shift commands of the electrically variable transmission between a first mode and a second mode, when the determination is made that the temperature of the battery pack is below the first threshold;

providing a command to the torque damper to decrease an amount of damping supplied to the engine, when the determination is made that the temperature of the battery pack is below the first threshold;

supplying a command to the engine control module to command the plurality of fuel injectors to inject fuel into all of the cylinders of the plurality of cylinders, when the determination is made that the temperature of the battery pack is below the first threshold; and providing a braking command from the system controller to the one or more brake pads, when the engine control module is supplying a command to the fuel injectors to inject fuel into all of the cylinders of the plurality of cylinders.

14. The method of claim 13, further comprising the step of:

increasing an amount of damping supplied to the engine, when the determination is made that the temperature of the battery pack is above a second threshold.

15. The method of claim 13, wherein the first threshold is a temperature is about $0° C. + 3° C$.

16. The method of claim 13, further comprising providing a command to the engine control module to command the plurality of fuel injectors to inject fuel into a portion of the cylinders of the plurality of cylinders, when the determination is made that the temperature of the battery pack is above a second threshold.

* * * * *